P. P. POLITOWSKI.
DYNAMO ELECTRIC MACHINE.
APPLICATION FILED APR. 24, 1914.

1,145,081.

Patented July 6, 1915.

Witnesses:
Arthur Hagg.
W. G. Weilman.

Inventor:
P. Paul Politowski
by Miller & Chindahl, Atty's

UNITED STATES PATENT OFFICE.

PETER PAUL POLITOWSKI, OF CHICAGO, ILLINOIS.

DYNAMO-ELECTRIC MACHINE.

1,145,081.  Specification of Letters Patent.  Patented July 6, 1915.

Application filed April 24, 1914. Serial No. 834,043.

*To all whom it may concern:*

Be it known that I, PETER PAUL POLITOWSKI, a citizen of the United States, residing at Chicago, in the county of Cook and State of Illinois, have invented certain new and useful Improvements in Dynamo-Electric Machines, of which the following is a specification.

This invention relates to dynamo-electric machines whether used as motors or generators, or for direct or alternating current, and has particular reference to the magnetic field poles of such machines.

The object of the invention is to provide field poles for dynamo-electric machines so constructed as to produce efficient magnetic effects without involving as much expense in construction as is ordinarily required for the most efficient field poles.

A further object is to distribute the magnetic strength of the field poles so as to reduce the counter magnetic effects of the armature and thus to maintain strong magnetic fields under heavy loads and to reduce the sparking tendency as well as the loss due to eddy currents and hysteresis in the poles.

A further object is to distribute the magnetic strength of the field so as to cause the conductors of the armature to receive substantially uniform magnetic effects during the greater portion of the passage under the influence of the poles.

Figure 1:
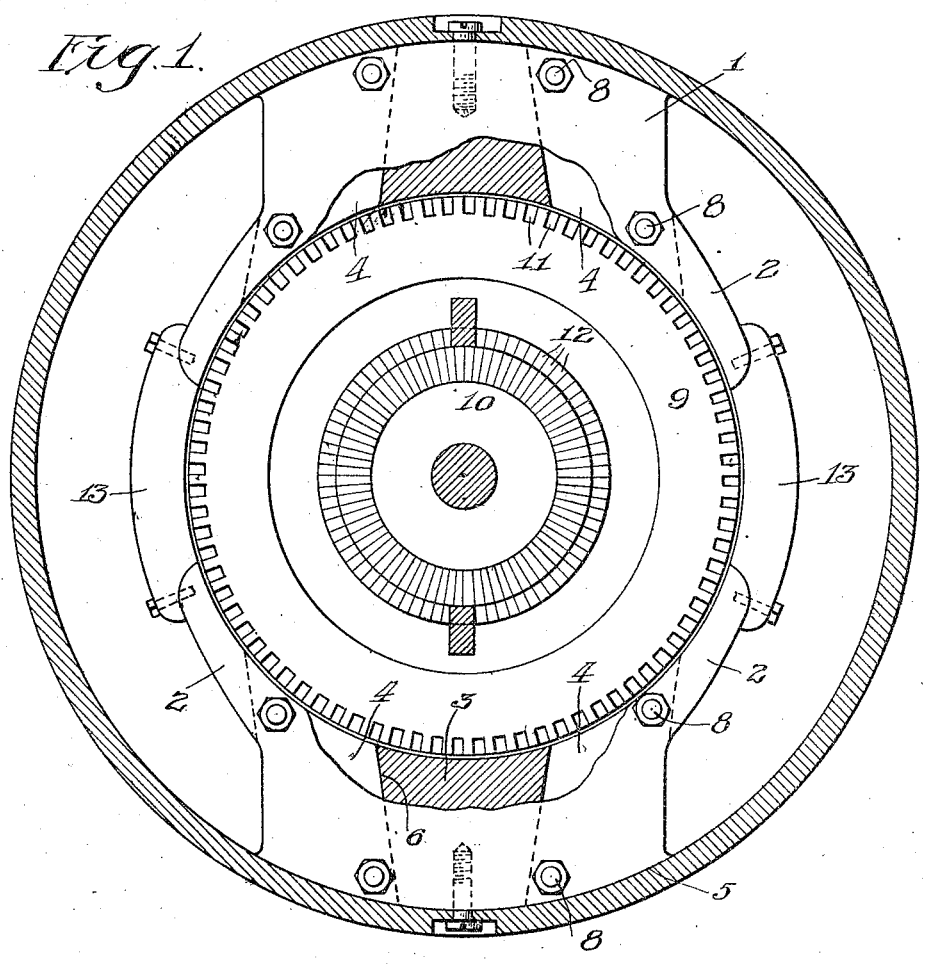
Figure 2:
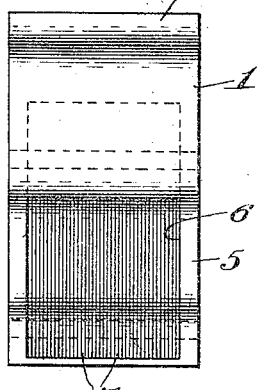

In the accompanying drawings, Figure 1 is a cross-sectional view of a dynamo-electric machine embodying the features of my invention, showing the field poles in elevation with a portion of the casings broken away; and showing the armature core without the windings in order to avoid confusion. Fig. 2 shows an end view of one of the magnetic poles.

In this instance I have illustrated a two-pole machine, but it is to be understood that any ordinary number of poles may be used. Each of the field poles 1 of the machine is composed in general of the pole tips 2, of a central portion 3, and the intermediate portions 4. The pole tips 2 and the central portion 3 are constructed of cast iron and may be cast integral, or may be connected together in any suitable manner. In this instance, I have shown these portions cast integral in connection with the casing 5 which not only holds the cast iron pieces together but also has openings 6 into which I insert the intermediate portions 4. These portions 4 are laminated, being composed of sheets 7 of iron or steel. Pins 8 are used to hold the sheets firmly together and in place.

In order to produce the best results by the use of my invention, I construct the pole pieces and the armature core 9 and commutator 10 so that the space between adjacent pole tips 2 will subtend an angle substantially equal to the angle subtended by the central portion 3 of the pole. In this instance, I have shown the angle thus formed to include eight slots 11 of the armature and eight commutator segments 12, it being understood that there is to be one coil per slot and per segment. I also construct the intermediate portions 4 so as to subtend an angle substantially $\frac{15}{16}$ of the angle subtended by the central portion 3. In this instance the intermediate portions 4 spanning $7\frac{1}{2}$ of the commutator segments and the armature slots. Also the portion of the pole tips adjacent to the core subtends an angle $\frac{9}{16}$ of the angle subtended by the central portion 3. In this instance the pole tips cover $4\frac{1}{2}$ of the armature slots. By constructing poles in this manner the volume of the laminated portion of the poles may be reduced materially without sacrificing the magnetic characteristics of the poles, in fact by such construction the magnetic characteristics are improved. Also the laminated portions of the field may be made of much smaller pieces and hence may be cut from portions of sheet steel which otherwise would be wasted. With reference to the magnetic characteristics of these poles, in view of the lower permeability of cast iron when compared with sheet steel, it is evident that the intermediate portions 4 will be much more strongly magnetized than the central portion 3, and hence the counter-magnetic effects of the armature will be reduced and the tendency of the magnetism to spread into the tips will be increased, so that the sparking tendency of the machine will be reduced. Also by thus distributing the magnetism of the poles, the conductors of the armature as they pass under the poles cut the lines of force at a more nearly uniform rate. The rate at which the lines of force are cut when the conductors are passing through a uniform field is proportional to the cosine of the angle rather than to the angle itself. As a consequence, if the field is uniform, a conductor passing under the intermediate portions 4 of the field cuts the lines more slowly than when passing under the central portion 3. But by increasing the strength of the intermediate portions the rate of cutting the lines when passing under this portion becomes more nearly the same as the rate when passing under the central portion. I have made no attempt in the construction of these poles to distribute the magnetism so that the cutting of the lines will be exactly uniform; but by this construction the rate becomes more nearly uniform than is ordinarily the case and it is evident that by special designing of the field along the lines which I have disclosed the rate of the cutting of the lines might be made substantially uniform while the conductors are passing between the tips of the pole. For the purpose of stiffening the pole tips I connect each adjacent pair of tips by a non-magnetic member 13. This prevents vibrations being set up in the tips and thus causing variations in the air gap or loosening of any of the parts.

I claim as my invention:

1. In a dynamo-electric machine, a field pole comprising a central cast iron portion, cast iron tips, and a laminated portion between said central portion and each of said tips.

2. In a dynamo-electric machine, a field pole comprising a casting having two pole tips and having a central portion, and having an opening between each of said tips and said central portion, and a laminated portion in each of said openings.

3. In a dynamo-electric machine, a field pole comprising a central cast iron portion, cast iron tips, and laminated iron portions between said central portion and the respective tips, the pitch of each of said laminated portions being substantially $\frac{15}{16}$ times as great as the pitch of said central portion.

4. A dynamo-electric machine having field poles, each of said poles comprising a central portion of cast iron, two cast iron tips, and a laminated portion between each of said tips and said central portion, the pitch of said central portion being substantially equal to the pitch from one pole tip to the adjacent pole tip.

5. In a dynamo-electric machine, a field pole comprising a central cast iron portion, cast iron tips, and laminated iron portions between said central portion and the respective tips, the pitch of each of said laminated portions being substantially $\frac{15}{16}$ times as great as the pitch of said central portion, and the pitch of each of said tips being substantially $\frac{3}{16}$ times as great as the pitch of said central portion.

6. A dynamo electric machine having field poles, each of said poles comprising a central cast iron portion, cast iron tips, and a laminated portion between each of said tips and said central portion; and a non-magnetic member connecting each pair of adjacent tips.

In testimony whereof, I hereunto set my hand in the presence of two witnesses.

PETER PAUL POLITOWSKI.

In the presence of—
   GEORGE L. CHINDAHL,
   MARGARET H. MANN.